United States Patent
Baugh et al.

(10) Patent No.: US 6,822,040 B2
(45) Date of Patent: Nov. 23, 2004

(54) BASECOAT COMPOSITION WITH IMPROVED REPAIR PROPERTIES

(75) Inventors: Leslie G. Baugh, Southfield, MI (US); David K. K. Lau, Royal Oak, MI (US); Thomas C. Balch, West Bloomfield, MI (US); Sergio E. Balatan, West Bloomfield, MI (US); Walter H. Ohrbom, Hartland Township, MI (US); James A. Laugal, White Lake, MI (US); David J. Law, Livonia, MI (US)

(73) Assignee: BASF Corporation, Southfield, MI (US)

( * ) Notice: Subject to any disclaimer, the term of this patent is extended or adjusted under 35 U.S.C. 154(b) by 0 days.

(21) Appl. No.: 09/962,700

(22) Filed: Sep. 25, 2001

(65) Prior Publication Data

US 2003/0060560 A1 Mar. 27, 2003

(51) Int. Cl.[7] .............................................. C08L 51/00
(52) U.S. Cl. ....................... 524/558; 524/558; 524/512; 524/528; 524/516; 524/515; 528/44; 528/48; 427/409; 428/402; 428/418
(58) Field of Search ................................ 524/558, 512, 524/528, 542, 516, 515; 528/44, 48; 427/409; 428/402, 418

(56) References Cited

U.S. PATENT DOCUMENTS

| | | | | |
|---|---|---|---|---|
| 3,832,217 A | | 8/1974 | Sato et al. ..................... 117/74 |
| 3,862,063 A | * | 1/1975 | Pettit, Jr. ....................... 524/40 |
| 4,268,542 A | | 5/1981 | Sakakibara et al. .......... 427/195 |
| 4,451,597 A | * | 5/1984 | Victorius ....................... 524/39 |
| 4,452,945 A | * | 6/1984 | Bowen et al. ............... 525/161 |
| 4,539,363 A | * | 9/1985 | Backhouse ................... 524/460 |
| 4,900,774 A | * | 2/1990 | Mitsuji et al. ............... 524/512 |
| 4,948,829 A | | 8/1990 | Mitsuji et al. ............... 524/457 |
| 5,147,453 A | * | 9/1992 | Panush et al. ............... 106/1.19 |
| 5,314,945 A | * | 5/1994 | Nickle et al. ................ 524/507 |
| 5,322,715 A | | 6/1994 | Jouck et al. ................. 427/409 |
| 5,379,947 A | | 1/1995 | Williams et al. .............. 241/21 |
| 5,397,646 A | * | 3/1995 | Nickle et al. ............. 428/423.1 |
| 5,473,032 A | | 12/1995 | Bederke et al. ........... 526/307.7 |
| 5,474,811 A | | 12/1995 | Rehfuss et al. ........... 427/407.1 |
| 5,714,264 A | | 2/1998 | Sacharski et al. ............ 428/413 |
| 5,840,372 A | | 11/1998 | Rink et al. ................ 427/407.1 |
| 5,939,195 A | * | 8/1999 | Allen et al. .................. 428/413 |
| 5,965,213 A | | 10/1999 | Sacharski et al. ............ 427/475 |
| 6,204,319 B1 | * | 3/2001 | Houze et al. ................ 524/495 |
| 6,316,572 B1 | * | 11/2001 | Nambu et al. ................. 528/33 |

FOREIGN PATENT DOCUMENTS

| | | | |
|---|---|---|---|
| CA | 2004988 | 12/1989 | ............. C08F/2/24 |
| EP | 0 029 598 | 11/1980 | ............. C09D/3/81 |
| EP | 0 571 977 | 5/1993 | ............. C09D/7/12 |
| EP | 0 572 900 | 5/1993 | ......... C09D/133/10 |
| EP | 0 844 285 | 8/1995 | ............. C09D/5/00 |
| EP | 0 709 415 | 10/1995 | ........... C08G/18/62 |
| EP | 0 960 917 | 1/1998 | ......... C09D/125/14 |
| FR | 71.45139 | 12/1971 | ............. C09D/3/00 |
| GB | 1 218 426 | 5/1988 | ........... C08L/75/04 |
| GB | 2341867 | 11/1999 | ............. C09D/5/36 |
| JP | 11-116766 | 4/1999 | ............. C08L/33/26 |
| WO | WO 90/06186 | 6/1990 | ............. B05D/7/26 |
| WO | WO 91/09685 | 7/1991 | ............. B05D/7/26 |
| WO | WO 93/23443 | 11/1993 | ......... C08F/220/28 |
| WO | WO 99/67339 | 12/1999 | ......... C09D/151/00 |

OTHER PUBLICATIONS

English Language Abstract for JP11–116766 filed Oct. 17, 1997.
English Language of the International Search Report for PCT/US 02/23376.

* cited by examiner

*Primary Examiner*—Tatyana Zalukaeva
*Assistant Examiner*—Satya Sastri

(57) ABSTRACT

A basecoat composition includes an acrylic polymer prepared from a combination of monomers including at least about 30% by weight ethyl acrylate, methyl acrylate, methyl methacrylate, or a combination of these. The basecoat composition also includes methylated melamine-formaldehyde resin and up to about 10% by weight of a butylated melamine-formaldehyde resin, based on the weight of the basecoat composition vehicle and butylated melamine resin. An at least partially cured layer of the basecoat composition offers improved adhesion with a coating composition layer applied over it and cured, whether the coating composition layer applied over it is another layer of the basecoat composition itself or a layer of a clearcoat composition.

9 Claims, No Drawings

BASECOAT COMPOSITION WITH IMPROVED REPAIR PROPERTIES

FIELD OF THE INVENTION

The present invention relates to automotive coatings with good repair properties that are cured at elevated temperatures and to methods for preparing and applying such compositions.

BACKGROUND OF THE INVENTION

Automotive finishes are applied in a series of coating layers, with each coating layer providing an important function in the performance of the composite finish. For instance, primer coating layers are used to protect the substrate from corrosion, chipping, and delamination of the coating from the substrate. Surfacer and primer surfacer layers are commonly used to provide a smooth surface upon which to apply the topcoat layers, and may add increased corrosion protection or chip protection. The topcoat layers provide beauty as well as protection against scratching, marring, and environmentally-induced degradation.

The topcoat coatings may be applied as a single, colored layer, but today most OEM automotive topcoats are applied in two coating layers—a colored basecoat layer and a transparent clearcoat layer. These original automotive finishes are usually thermoset, being cured usually by baking at temperatures typically from about 250° F. (121° C.) to 280° F. (138° C.) for the topcoat coating layers and about 350° F. (177° C.) to 380° F. (193° C.) for the primer and surfacer layers. Most coating layers are cured before the next layer is applied, but the clearcoat layer is generally applied over the uncured basecoat layer. Typically, a basecoat layer is applied and flashed (organic solvent and/or water evaporated at least to some degree from the coating layer), next the clearcoat layer is applied and flashed, then both basecoat and clearcoat layers are cured at one time.

Occasionally, for various reasons, there is a malfunction in the process and the clearcoat layer does not get applied over the uncured basecoat layer. For example, the clearcoat bells may malfunction, or the supply of the clearcoat composition may be interrupted. The basecoat layer may then be cured without applying a clearcoat layer over it. During the repair process, the cured basecoat layer then receives a new layer of basecoat and a clearcoat layer, which are cured together at the normal bake schedule.

Because the coating layers are specially formulated to serve specific functions and to be applied in a specific order, the basecoat does not normally need to adhere to a baked basecoat layer. For some basecoat technologies, extra steps are required to ensure that the basecoat does adhere to the baked basecoat layer. For example, the baked basecoat layer can be lightly sanded manually ("scuff sanded") to improve adhesion of the repair basecoat layer. Sanding is not desirable, however, because of the added time and expense and because the dust generated can contaminate the repair coating or other unbaked coatings. Another solution is to re-prime the vehicle before the repair basecoat layer is applied. A new primer requires more painting steps, more baking (which may tend to overbake the lower layers already applied because primers generally are cured at higher temperatures), and more expense. Further, a special primer may be needed because it will go over a topcoat layer instead of onto the substrate or electrocoat primer layer.

It would be desirable, therefore, to have a coating composition as the basecoat that can be applied directly over a cured basecoat layer of itself and can provide the desired adhesion without having to sand or prime the cured basecoat layer first.

SUMMARY OF THE INVENTION

The invention provides a basecoat composition with improved high bake repair properties. An at least partially cured layer of the basecoat composition offers improved adhesion with a coating composition layer applied over it and cured, whether the coating composition layer applied over it is another layer of the basecoat composition itself or a layer of a clearcoat composition. The basecoat or clearcoat composition can be applied over even a fully cured basecoat layer without the need to first prime or sand the cured basecoat layer. The basecoat composition includes an acrylic polymer prepared from a combination of monomers including at least about 30% by weight, preferably at least about 40% by weight, of ethyl acrylate, methyl acrylate, methyl methacrylate or any combination of these.

It is advantageous to use a combination of methylated melamine resin and butylated melamine resin in the basecoat composition along with the acrylic polymer. "Methylated melamine resin" and "butylated melamine resin" refer to melamine/aldehyde aminoplast resins that are partially or fully alkylated [actually, etherified] using, respectively, methanol and butanol. The melamine resins are preferably melamine/formaldehyde condensates, although other aldehydes, such as acetaldehyde, crotonaldehyde, and benzaldehyde, may be used, and include monomeric or polymeric resins. Hexamethoxy methylated melamine and hexabutoxy methylated melamine are preferred examples of the methylated melamine resin and the butylated melamine resin. The butylated melamine resin is preferably at least about 5% by weight of the vehicle. As used herein, "vehicle" refers to the nonvolatile resinous and polymeric portion of the coating composition, including the acrylic polymer already mentioned.

The invention further provides a method of applying a coating finish, including at least a step of applying the basecoat composition of the invention over an at least partially cured layer of itself. An "at least partially cured" coating layer refers to a layer that has been exposed to conditions effective to cause at least partial curing, preferably full curing, of the coating layer. In one embodiment of the method, the coating layer over which the basecoat composition is applied has been baked at about the standard, or normal, bake schedule (i.e., baking temperature or temperatures and time or times) for that layer.

DETAILED DESCRIPTION OF THE INVENTION

The basecoat composition of the invention includes an acrylic polymer prepared from a combination of monomers including at least about 30% by weight ethyl acrylate, methyl acrylate, methyl methacrylate, or any combination of these. The acrylic polymer may be prepared from a combination of monomers including preferably at least about 35%, more preferably at least about 40% by weight ethyl acrylate, methyl acrylate, methyl methacrylate, or any combination of these. The acrylic polymer may be prepared from a combination of monomers including preferably up to about 65%, more preferably up to about 45%, and still more preferably up to about 40% by weight ethyl acrylate, methyl acrylate, methyl methacrylate, or any combination of these.

The basecoat composition is thermosetting. Preferably, the acrylic polymer has active hydrogen functionality. The active hydrogen functionality is preferably selected from hydroxyl functionality, carbamate functionality, and combinations of these. When used in connection with the invention, the term "carbamate" refers to a group having a structure

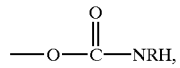

in which R is H or alkyl. Preferably, R is H or alkyl of from 1 to about 4 carbon atoms, and more preferably R is H.

The acrylic polymer is prepared by addition polymerization of the ethyl acrylate, methyl acrylate, methyl methacrylate, or any combination of these along with a monomer bearing the active hydrogen functionality and preferably one or more comonomers. The ethyl acrylate, methyl acrylate, methyl methacrylate, or combination of these should be at least about 30% by weight of the total weight of monomers polymerized.

Examples of suitable co-monomers include, without limitation, α,β-ethylenically unsaturated monocarboxylic acids containing 3 to 5 carbon atoms such as acrylic, methacrylic, and crotonic acids and the alkyl and cycloalkyl esters of those acids; α,β-ethylenically unsaturated dicarboxylic acids containing 4 to 6 carbon atoms and the anhydrides, monoesters, and diesters of those acids; vinyl esters, vinyl ethers, vinyl ketones, and aromatic or heterocyclic aliphatic vinyl compounds. Representative examples of suitable esters of acrylic, methacrylic, and crotonic acids include, without limitation, those esters from reaction with saturated aliphatic alcohols containing 1 to 20 carbon atoms, such as methyl, ethyl, propyl, isopropyl, n-butyl, isobutyl, tert-butyl, hexyl, 2-ethylhexyl, dodecyl, cyclohexyl, alkyl-substituted cyclohexyl, alkanol-substituted cyclohexyl, such as 2-tert-butyl and 4-tert-butyl cyclohexyl, 4-cyclohexyl-1-butyl, and 3,3,5,5,-tetramethyl cyclohexyl; isobornyl, lauryl and stearyl acrylates, methacrylates, and crotonates; and polyalkylene glycol acrylates and methacrylates. Representative examples of other ethylenically unsaturated polymerizable monomers include, without limitation, such compounds as fumaric, maleic, and itaconic anhydrides, monoesters, and diesters with alcohols such as methanol, ethanol, propanol, isopropanol, butanol, isobutanol, and tert-butanol. Representative examples of co-polymerizable vinyl monomers include, without limitation, such compounds as vinyl acetate, vinyl propionate, vinyl ethers such as vinyl ethyl ether, vinyl and vinylidene halides, and vinyl ethyl ketone. Representative examples of aromatic or heterocyclic aliphatic vinyl compounds include, without limitation, such compounds as styrene, α-methyl styrene, vinyl toluene, tert-butyl styrene, and 2-vinyl pyrrolidone. The co-monomers may be used in any combination.

The basecoat composition may be aqueous. The acrylic polymer may be polymerized to include a sufficient number of dispersing groups, such as acid groups that may be salted with ammonia or amines to disperse the polymer or a nonionic stabilizer such as a polyethylene glycol substituent. In one embodiment, the acrylic polymer is polymerized by emulsion polymerization. Two-stage emulsion polymers may also be used.

One preferred two-stage emulsion polymer contains composite polymeric particles produced by emulsion polymerization of a first stage polymer followed by emulsion polymerization of a second stage polymer in the presence of the first stage polymer. A two-stage emulsion polymer produced in this way has properties that are different from either a blend of separate emulsions of the first stage and second stage polymers or a two-stage emulsion polymer in which the order of polymerization of the first stage and second stage polymers is reversed.

One preferred emulsion polymer is prepared using, in addition to the ethyl acrylate, methyl acrylate, and/or methyl methacrylate from about 0.5% to about 15%, preferably from about 1% to about 10%, more preferably from about 1% to about 5% by weight of an acid-functional or anhydride-functional ethylenically unsaturated monomer. In addition, a preferred emulsion polymer includes from about 5% to about 50%, preferably from about 10% to about 45% by weight of an ethylenically unsaturated monomer that provides the active hydrogen functionality. In a two-stage emulsion, the acid monomer and active hydrogen monomer may be distributed in a desired way between the two stages.

Examples of suitable monomers having carboxylic acid functionality include, without limitation, acrylic acid, methacrylic acid, maleic acid, crotonic acid, itaconic acid, fumaric acid, and vinylacetic acid, monoesters of polymerizable diacids, and combinations of these. The corresponding anhydrides can be used in place of or in addition to the acid, and the acid will be generated when the anhydride monomer is introduced into the aqueous medium during polymerization.

Examples of suitable monomers having hydroxyl functionality include, without limitation, hydroxyethyl acrylate, hydroxyethyl methacrylate, hydroxypropyl acrylate, hydroxypropyl methacrylate, hydroxybutyl acrylate, hydroxypropyl methacrylate, and combinations of these. The monomer that provides the active hydrogen functionality may also be one having a group that is modified after polymerization to produce the active hydrogen functionality. For example, groups that can be converted to carbamate include cyclic carbonate groups, epoxy groups, and unsaturated bonds. Cyclic carbonate groups can be converted to carbamate groups by reaction with ammonia or a primary amine, which ring-opens the cyclic carbonate to form a β-hydroxy carbamate. Epoxy groups can be converted to carbamate groups by first converting to a cyclic carbonate group by reaction with $CO_2$. This can be done at any pressure from atmospheric up to supercritical $CO_2$ pressures, but is preferably under elevated pressure (e.g., 60–150 psi). The temperature for this reaction is preferably 60–150° C. Useful catalysts include any that activate an oxirane ring, such as tertiary amine or quaternary salts (e.g., tetramethyl ammonium bromide), combinations of complex organotin halides and alkyl phosphonium halides (e.g., $(CH_3)_3SnI$, $Bu_4SnI$, $Bu_4PI$, and $(CH_3)_4PI$), potassium salts (e.g., $K_2CO_3$, KI) preferably in combination with crown ethers, tin octoate, calcium octoate, and the like. The cyclic carbonate group can then be converted to a carbamate group as described above. Any unsaturated bond can be converted to a carbamate group by first reacting with peroxide to convert to an epoxy group, then with $CO_2$ to form a cyclic carbonate, and then with ammonia or a primary amine to form the carbamate.

Other groups, such as hydroxyl groups or isocyanate groups can also be converted to carbamate groups. Hydroxyl groups can be converted to carbamate groups by reaction with a monoisocyanate (e.g., methyl isocyanate) to form a secondary carbamate group (that is, a carbamate of the structure above in which R is alkyl) or with cyanic acid (which may be formed in situ by thermal decomposition of urea) to form a primary carbamate group (i.e., R in the above formula is H). This reaction preferably occurs in the presence of a catalyst as is known in the art. A hydroxyl group can also be reacted with phosgene and then ammonia to form a primary carbamate group, or by reaction of the hydroxyl with phosgene and then a primary amine to form a compound having secondary carbamate groups. Finally, carbamates can be prepared by a transesterification approach where an hydroxyl group is reacted with an alkyl carbamate (e.g., methyl carbamate, ethyl carbamate, butyl carbamate) to form a primary carbamate group-containing compound. This reaction is performed at elevated temperatures, preferably in the presence of a catalyst such as an organometallic catalyst (e.g., dibutyltin dilaurate). Other techniques for preparing carbamates are also known in the art and are described, for example, in P. Adams & F. Baron, "Esters of Carbamic Acid", *Chemical Review*, v. 65, 1965 and in U.S. Pat. No. 5,474,811, issued to Rehfuss and St. Aubin.

The emulsion polymer or the composite polymeric particles of the two-stage emulsion polymer preferably have a theoretical glass transition temperature of not more than about 30° C., and preferably no more than about 25° C. In a more preferred embodiment, the theoretical glass transition temperature of not more than about 0° C. The theoretical glass transition temperature is preferably at least about −30° C., more preferably at least about −25° C., and even more preferably at least about −20° C. The theoretical glass transition temperature preferably is in a range of from about −30° C. to about 30° C., more preferably from about −25° C. to about 25° C., and still more preferably from about −25° C. to about 0° C. Theoretical glass transition temperatures may be calculated from glass transition temperatures of homopolymers of the monomers polymerized according to the well-known Fox equation in which the reciprocal of the glass transition temperature (in degrees Kelvin) of the copolymer is the summation of the reciprocal of the glass transition temperature (in degrees Kelvin) for a homopolymer of each monomer multiplied by the weight fraction of that monomer in the copolymer. Other methods are also known for deriving theoretical glass transition temperatures and may be used, such as determining the maximum of a curve of measured glass transition temperatures for polymers of the same monomer compositions and different molecular weights.

The acrylic polymer may be prepared using conventional techniques, such as by heating the monomers in the presence of a polymerization initiating agent and optionally chain transfer agents. For example, the polymerization may be carried out in solution or emulsion polymerization, although it is also possible to polymerize the acrylic polymer in bulk.

The reaction is usually carried out at temperatures from about 20° C. to about 200° C. The reaction may conveniently be done at the temperature at which the solvent or solvent mixture refluxes, although with proper control a temperature below the reflux may be maintained. The initiator should be chosen to match the temperature at which the reaction is carried out, so that the half-life of the initiator at that temperature should preferably be no more than about thirty minutes.

When the acrylic polymer is an emulsion polymer, it may be emulsion polymerized according to well-known methods. In the case of a two-stage emulsion polymer, the first stage monomers are added and polymerized first in the aqueous medium, followed by addition and polymerization of the second stage monomers. A portion of organic solvent may be included, but preferably less than about 5% of the total of medium (water and organic solvent) is organic solvent, and preferably no organic solvent is included. Suitable examples of water-miscible organic solvent include, without limitation, esters, alkylene glycol ethers, alkylene glycol ether esters, lower molecular weight aliphatic alcohols, and so on. Ionic or amphoteric surfactants, such as sodium lauryl sulfate, nonionic surfactants based on polyethoxylated alcohols or polyethoxy-polyalkoxy block copolymers, polyoxyethylenenonylphenyl ethers, polyoxyethylenealkylallyl ether sulfuric acid esters, amino and alkali salts of dodecylbenzenesulfonic acid such as the dimethylethanolamine salt of dodecylbenzenesulfonic acid and sodium dodecylbenzenesulfonic acid, and sodium dioctylsulfosuccinate, are preferably included. The reactor is charged with water and a surfactant. It is preferred to charge from about 0.08% by weight to about 0.5% by weight, preferably from about 0.15% by weight to about 0.35% by weight, based on the total weight of monomers polymerized in the first and second stages, of an anionic surfactant. The combination of monomers to be polymerized (or polymerized in each stage) may be pre-emulsified in water and 1% to 5% by weight surfactant, based on monomer weight, before being added to the reactor.

In general, emulsion polymerization is carried out at temperatures of from about 30° C. to about 95° C., preferably from about 50° C. to about 90° C.

A suitable initiator capable of producing free radicals is used in the polymerization. Typical initiators are organic peroxides such as dialkyl peroxides such as di-t-butyl peroxide, peroxyesters such as t-butyl peroxy-2-ethylhexanoate, peroxyisopivalate, and t-butyl peracetate, peroxydicarbonates, diacyl peroxides, hydroperoxides such as t-butyl hydroperoxide, and peroxyketals; benzoyl peroxide, lauroyl peroxide, diisopropyldicarbonate, azo compounds such as 2,2'-azobis(2-methylbutanenitrile), 1,1'-azobis(cyclohexanecarbonitrile), azodiisobutyronitrile, and 4,4-azobis(4-cyanovaleric acid); persulfate initiators such as ammonium persulfate, potassium persulfate, and sodium persulfate, and alkali metal peroxydiphosphates, in some cases in combination with reducing agents such as sodium disulfite, hydrazine, hydroxylamine and catalytic amounts of accelerators such as iron, cobalt, cerium, and vanadyl salts, preferably alkali metal or ammonium peroxydisulfates. The initiators may be used in combination. Chain transfer agents may be added, if desired, to control molecular weight. Typical chain transfer agents include, without limitation, mercaptan compounds such as alkyl mercaptans, e.g., octyl mercaptan and dodecyl mercaptan; mercaptopropionic acid, and esters of mercaptopropionic acid; halogenated compounds, thiosalicylic acid, mercaptoacetic acid, mercaptoethanol and other thiol alcohols, and dimeric alpha-methyl styrene.

The coating composition further includes a crosslinker or curing agent reactive with the acrylic polymer. Useful crosslinkers include, without limitation, materials having active methylol or methylalkoxy groups, such as aminoplast crosslinking agents or phenol/formaldehyde adducts; curing agents that have isocyanate groups, particularly blocked isocyanate curing agents; curing agents that have acid groups, silane groups, and anhydride groups; and mixtures thereof. Examples of preferred curing agent compounds include, without limitation, melamine formaldehyde crosslinkers (including monomeric or polymeric melamine resin and partially or fully alkylated melamine resin), blocked or unblocked polyisocyanates (e.g., toluene diisocyanate, MDI, isophorone diisocyanate, hexamethylene diisocyanate, and isocyanurates, biurets, allophanates, or other oligomers of these, which may be blocked, for example, with alcohols or oximes), urea resins (e.g., methylol ureas such as urea formaldehyde resin, alkoxy ureas such as butylated urea formaldehyde resin), polyanhydrides (e.g., polysuccinic anhydride), and silane-functional crosslinkers (e.g., trimethoxy siloxane). Another suitable crosslinking agent is tris(alkoxy carbonylamino) triazine. The curing agent may be combinations of these, particularly combinations that include aminoplast crosslinking agents with, e.g., tris(alkoxy carbonylamino) triazine and/or blocked polyisocyanates. Aminoplast resins such as melamine formaldehyde resins or urea formaldehyde resins are especially preferred.

It is advantageous to use a combination of methylated melamine resin and butylated melamine resin in the basecoat composition along with the acrylic polymer. The butylated melamine resin is preferably at least about 5% by weight of the nonvolatile vehicle, more preferably at least about 10% by weight of the nonvolatile vehicle, especially for better adhesion of a clearcoat layer over the baked basecoat layer. The butylated melamine resin is preferably up to about 10% by weight of the nonvolatile vehicle. In the case of a waterborne basecoat composition, the butylated melamine can combined with an anionic or nonionic dispersant and added to the coating, or pre-emulsified in water and then added to the coating.

The coating composition used in the practice of the invention may include a catalyst to enhance the cure reaction. For example, when aminoplast compounds, especially monomeric melamines, are used as a curing agent, a strong acid catalyst may be utilized to enhance the cure reaction. Such catalysts are well-known in the art and include, without limitation, p-toluenesulfonic acid, dinonylnaphthalene disulfonic acid, dodecylbenzenesulfonic acid, phenyl acid phosphate, monobutyl maleate, butyl phosphate, and hydroxy phosphate ester. Strong acid catalysts are often blocked, e.g. with an amine. Other catalysts that may be useful in the composition of the invention include Lewis acids, zinc salts, and tin salts.

An organic solvent may optionally be utilized in the coating composition. Preferably, the solvent is selected from ketones, esters, and ethers, particularly alkylene glycol monoalkyl ethers and the monoesters of these.

At least one pigment is included. The pigment may be any organic or inorganic compounds or colored materials, fillers, metallic or other inorganic flake materials such as pearlescent mica flake pigments or metallic flake pigments such as aluminum flake, and other materials of kind that the art normally includes in such coatings. Pigments and other insoluble particulate compounds such as fillers are usually used in the composition in an amount of 1% to 200%, based on the total solid weight of binder components (i.e., a pigment-to-binder ratio of 0.01 to 2).

Additional agents, for example surfactants, fillers (e.g., talc or barytes), stabilizers, wetting agents, rheology control agents, dispersing agents, adhesion promoters, fillers, UV absorbers, hindered amine light stabilizers, etc. may be incorporated into the coating composition. While such additives are well-known in the prior art, the amount used must be controlled to avoid adversely affecting the coating characteristics.

Coating compositions can be coated on the article by any of a number of techniques well-known in the art. These include, for example, spray coating, dip coating, roll coating, curtain coating, and the like. For automotive body panels, spray coating is preferred.

The basecoat of a composite basecoat-clearcoat coating is typically applied over one or more layers of primer coating, which are preferably cured before the basecoat is applied. A clearcoat composition is then applied over the basecoat, typically before the basecoat is cured in what is generally known as a "wet-on-wet" application, with the basecoat and clearcoat being cured at the same time. The clearcoat composition may be any of a number of types well-known in the art. Polymers known in the art to be useful in clearcoat compositions include acrylics, vinyls, polyurethanes, polycarbonates, polyesters, alkyds, and polysiloxanes. Preferred polymers include acrylics and polyurethanes. Clearcoat polymers may be thermoplastic, but are preferably crosslinkable and comprise one or more type of crosslinkable functional groups. Such groups include, for example, hydroxy, isocyanate, amine, epoxy, acrylate, vinyl, silane, and acetoacetate groups. These groups may be masked or blocked in such a way so that they are unblocked and available for the crosslinking reaction under the desired curing conditions, generally elevated temperatures. Useful crosslinkable functional groups include hydroxy, epoxy, acid, anhydride, silane, and acetoacetate groups. Preferred crosslinkable functional groups include hydroxy functional groups and amino functional groups. Clearcoat compositions are preferably thermosetting and include one or more suitable crosslinkers, such as those already mentioned. One preferred clearcoat composition is a powder slurry clearcoat composition. Powder slurry clearcoat compositions are described, for example, in Sacharski et al., U.S. Pat. No. 5,965,213; Sacharski et al., U.S. Pat. No. 5,714,264; U.S. Pat. No. 5,379,947; U.S. Pat. No. 4,268,542; and copending U.S. application Ser. No. 314,404.

As already discussed, in some situations the basecoat is cured without a clearcoat composition being applied over it. This happens, for example, because of spray equipment malfunctioning. The basecoat composition may be cured at from about 230° F. (110° C.) to about 280° F. (about 140° C.), preferably from about 240° F. (about 115° C.) to about 265° F. (about 130° C.), typically from about 10 minutes to about 45 minutes, but usually from about 15 minutes to about 40 minutes.

A second layer of the basecoat composition of the invention is then applied over the cured first basecoat layer. A layer of clearcoat composition is applied over the second basecoat layer and, preferably, the two layers are cured at the same time at from about 230° F. (110° C.) to about 280° F. (about 140° C.), preferably from about 240° F. (about 115° C.) to about 265° F. (about 130° C.) for about 1 minute to about 60 minutes, preferably from about 10 minutes to about 45 minutes, more preferably from about 15 minutes to about 40 minutes.

Sometimes the basecoat composition may be applied over a layer of a cured basecoat/clearcoat composite coating, e.g. when there was a defect in the initial basecoat/clearcoat composite coating. A second layer of the basecoat composition is then applied over a portion of the cured basecoat/clearcoat layers. A second layer of clearcoat composition is applied over the second basecoat layer. Again, it is preferred for the second basecoat and clearcoat layers to be cured together at the times and temperatures already mentioned.

The basecoat composition of the invention offers significant improvement in adhesion when a clearcoat composition is applied over the cured basecoat layer. This situation may arise in a two-tone paint application, where one color of basecoat is applied to an area of the vehicle, then cured, followed by application of a second color of basecoat to the remaining areas of the vehicle. The clearcoat composition may then be applied over both the cured first basecoat layer and the second, uncured basecoat layer.

The cured basecoat layers produced from the compositions of the invention have excellent adhesion over both cured layers of itself and cured clearcoat layers.

The invention is further described in the following examples. The examples are merely illustrative and do not in any way limit the scope of the invention as described and claimed. All parts are by weight unless otherwise indicated.

EXAMPLE 1

Basecoat Composition and Coating Method of the Invention

An aqueous polymer emulsion was prepared by emulsion polymerization using a monomer mixture of 30% by weight methyl methacrylate, 21% by weight ethyl acrylate, 12.6% by weight of a hydroxyl-functional ethylenically unsaturated monomer, 1.6% by weight of an acid-functional monomer, and the balance being other copolymerizable ethylenically unsaturated monomers.

A basecoat composition was prepared by combining 26.7 parts by weight deionized water, 33 parts by weight of the aqueous polymer emulsion, 4.4 parts by weight of monomeric hexamethoxy methylated melamine, 27.5 parts by weight of a white pigment paste, 7.5 parts by weight of an organic cosolvent, and a tertiary amine as a salting amine for the acid functionality of the aqueous polymer emulsion.

The basecoat composition was applied at a thickness to yield approximately 1 mil (25 microns) cured basecoat to two primed steel panels. The applied basecoat composition was flashed for 5 minutes at 140° F. (60° C.). One panel was baked for 20 minutes at 280° F. (138° C.) and the second panel was baked for 35 minutes at 300° F. (149° C.). Both panels were then coated with a second layer of the basecoat composition at a thickness to yield approximately 1 mil (25 microns) cured basecoat layer. The applied basecoat was flashed for 5 minutes at 140° F. (60° C.) and then coated with a layer of a commercial clearcoat composition (R126CG2020, available from BASF Corporation) at a thickness to yield approximately 2 mils (50 microns) cured clearcoat layer. The clearcoat layer was flashed as recommended by the supplier. Both basecoat and clearcoat layers were cured together, the first panel for 20 minutes at 280° F. (138° C.) and the second panel for 9 minutes at 270° F. (132° C.). The first panel represents a standard bake, while the second panel represents an overbake/underbake situation.

The adhesion of the coatings on the two panels were tested according to ASTM D3359-87 (crosshatch adhesion). Both panels had no adhesion loss.

COMPARATIVE EXAMPLE A

Comparative Basecoat Composition and Coating Method

An aqueous polymer emulsion was prepared by emulsion polymerization according to the method of Example 1, except that the monomer mixture was changed by using only 26.5% by weight methyl methacrylate and no ethyl acrylate. Butyl methacrylate was used in place of the ethyl acrylate and the rest of the methyl methacrylate.

A basecoat composition was prepared according to Example 1, except substituting the aqueous polymer emulsion of this Comparative Example A for the aqueous polymer emulsion of Example 1.

Test panels were prepared using this basecoat composition in the same way as were the test panels of Example 1 and were tested for adhesion. Both test panels had 100% adhesion loss (total adhesion failure) at the interface of the first baked basecoat layer and the second basecoat layer.

EXAMPLE 2

Basecoat Composition and Method of the Invention

An aqueous polymer emulsion was prepared by emulsion polymerization using a monomer mixture of 36.2% by weight methyl methacrylate, 12.8% by weight of a hydroxyl-functional ethylenically unsaturated monomer, 1.2% by weight of an acid-functional monomer, and the balance being other copolymerizable ethylenically unsaturated monomers.

A basecoat composition was prepared by combining 26.2 parts by weight deionized water, 34.4 parts by weight of the aqueous polymer emulsion, 18.9 parts by weight of an aluminum mixture (5.4 parts by weight aluminum flake, 2.9 parts by weight of monomeric hexamethoxy methylated melamine, 2.2 parts by weight of a dispersant, and the balance organic solvent), 6.8 parts by weight of emulsified butylated melamine (29% by weight butylated melamine pre-emulsified in water using a dispersant), a tertiary amine as a salting amine for the acid functionality of the aqueous polymer emulsion, and 12.55 parts by weight of additives (7.8% by weight active).

The basecoat composition was applied at a thickness to yield approximately 0.5 mil (12.5 microns) cured basecoat to two primed steel panels. The applied basecoat composition was flashed for 5 minutes at 140° F. (60° C.). One panel was baked for 20 minutes at 280° F. (138° C.) and the second panel was baked for 20 minutes at 300° F. (149° C.). The panels were then coated with a second layer of the basecoat composition at a thickness to yield approximately 0.5 mil (12.5 microns) cured basecoat layer. The applied basecoat was flashed for 5 minutes at 140° F. (60° C.) and then coated with a layer of a commercial clearcoat composition (R126CG2020, available from BASF Corporation) at a thickness to yield approximately 2 mils (50 microns) cured clearcoat layer. The clearcoat layer was flashed as recommended by the supplier. Both basecoat and clearcoat layers were cured together for 20 minutes at 280° F. (138° C.).

The coatings on the two panels were tested for crosshatch adhesion. The first panel had no adhesion loss and the second panel had less than 5% adhesion loss.

COMPARATIVE EXAMPLE B

Comparative Basecoat Composition and Coating Method

An aqueous polymer emulsion was prepared by emulsion polymerization according to the method of Example 2, except that the monomer mixture was changed by using only 4% by weight methyl methacrylate. Butyl acrylate was used in place of the methyl methacrylate.

A basecoat composition was prepared according to Example 2, except substituting the aqueous polymer emulsion of this Comparative Example B for the aqueous polymer emulsion of Example 2.

Test panels were prepared using this basecoat composition in the same way as were the test panels of Example 2 and were tested for adhesion. Both test panels had more than 65% adhesion loss at the interface of the first baked basecoat layer and the second basecoat layer.

The invention has been described in detail with reference to preferred embodiments thereof. It should be understood, however, that variations and modifications can be made within the spirit and scope of the invention.

What is claimed is:

1. A basecoat composition comprising at least one pigment and a vehicle consisting essentially of:
   an acrylic polymer prepared from a combination of monomers including from about 10% to about 45% by weight of an ethylenically unsaturated monomer that provides active hydrogen functionality and at least about 30% by weight of at least one member selected from the group consisting of ethyl acrytate, methyl acrylate, methyl methacrylate, and combinations thereof, a methylated melamine-formaldehyde resin, and up to about 10% by weight of a butylated melamine-formaldehyde resin, based on the weight of the basecoat composftion vehicle;

wherein the basecoat composition is aqueous.

2. A basecoat composition according to claim 1, further comprising at least about 5% by weight of a butylated melamine-formaldehyde, based on the weight of the basecoat composition vehicle.

3. A basecoat composition according to claim 1, wherein the acrylic polymer is prepared from a combination of monomers comprising at least about 40% by weight of at least one member selected from the group consisting of ethyl acrylate, methyl acrylate, methyl methacrylate, and combinations thereof.

4. A basecoat composition according to claim 1, wherein the acrylic polymer is prepared from a combination of monomers comprising up to about 50% by weight of at least one member selected from the group consisting of ethyl acrylate, methyl acrylate, methyl methacrylate, and combinations thereof.

5. A basecoat composition according to claim 1, wherein the acrylic polymer has active hydrogen functionality.

6. A basecoat composition according to claim 1, wherein the acrylic polymer is prepared from a combination of monomers comprising from about 0.5% to about 15% of a member selected from the group consisting of acid-functional ethylenically unsaturated monomers, anhydride-functional ethylenically unsaturated monomers, and combinations thereof.

7. A basecoat composition according to claim 1, wherein the acrylic polymer is prepared from a combination of monomers comprising from about 1% to about 5% of a member selected from the group consisting of acid-functional ethylenically unsaturated monomers, anhydride-functional ethylenically unsaturated monomers, and combinations thereof.

8. A basecoat composition according to claim 1, wherein the acrylic polymer is prepared from a combination of monomers comprising from about 5% to about 50% of a member selected from the group consisting of active hydrogen-functional ethylenically unsaturated monomers and combinations thereof.

9. A basecoat composition according to claim 1, wherein the acrylic polymer has functionality selected from the group consisting of hydroxyl functionality, carbamate functionality, and combinations thereof.

* * * * *